United States Patent [19]
Wickham

[11] Patent Number: 6,084,718
[45] Date of Patent: *Jul. 4, 2000

[54] METHOD AND APPARATUS FOR HIGH ENERGY PROPAGATION BACK FOCUS CONTROL

[75] Inventor: Michael G. Wickham, Rancho Palos Verdes, Calif.

[73] Assignee: TRW Inc., Redondo Beach, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/046,260

[22] Filed: Mar. 23, 1998

[51] Int. Cl.7 ............................. G02B 3/00; G02B 3/02
[52] U.S. Cl. ........................................ 359/642; 359/718
[58] Field of Search .................... 359/626, 642, 359/718

[56] References Cited

U.S. PATENT DOCUMENTS

| | | | |
|---|---|---|---|
| 3,817,604 | 6/1974 | Watt | 359/748 |
| 4,156,209 | 5/1979 | Herbst | 372/101 |
| 4,525,042 | 6/1985 | Muchel | 359/380 |
| 5,796,523 | 8/1998 | Hall | 359/629 |
| 5,864,128 | 1/1999 | Plesko | 235/462 |

FOREIGN PATENT DOCUMENTS

| | | | |
|---|---|---|---|
| 2704359 | 8/1977 | Germany | G02B 13/14 |
| 2188446 | 9/1987 | United Kingdom | G02B 27/100 |

*Primary Examiner*—Georgia Epps
*Assistant Examiner*—Saeed Seyrafi
*Attorney, Agent, or Firm*—Michael S. Yatsko; Connie M. Thousand

[57] ABSTRACT

A method and apparatus for adjusting the location of the back focus of a lens while maintaining the primary focal point location thus eliminating the need to position external components around the back focus location. Instead, the back focus can be positioned around the external components. The shape of the first and second surfaces of the lens are altered to adjust the back focus to a desired location while maintaining the location of the primary focus.

17 Claims, 1 Drawing Sheet

METHOD AND APPARATUS FOR HIGH ENERGY PROPAGATION BACK FOCUS CONTROL

BACKGROUND OF THE INVENTION

The present invention relates generally to high energy propagation devices, and more particularly to a lens having an adjustable back focus.

Lenses are typically utilized in systems which require focusing light at a predetermined location referred to as a primary focal point. For a typical lens, the light incident on a first surface of the lens propagates through the lens and exits the lens through a second surface of the lens. The surfaces of the lens are configured to focus the light at the primary focal point. A portion of the light which is incident on the first and second surfaces of the lens is reflected back from the lens. Typically, the first surface of the lens is convex in shape to the incident light resulting in the light reflected off the first surface being dispersed. On the other hand, the second surface of the lens is typically concave in shape to the incident light resulting in the light reflected off the second surface focusing at a back focal point.

Typically, an anti-reflective coating is applied to the surfaces of the lens to minimize the amount of light reflected from the first and second surfaces. The anti-reflective coating typically reduces the amount of back reflected light to as small as one tenth of one percent of the incident light. This small amount of reflected light is inconsequential to the operation of the typically system and is ignored for most lens applications. However for high energy applications, such as high power lasers, even this small amount of light, when brought to a focus can damage and eventually destroy components located at the back focal point.

Due to the optics of the laser, the designer is limited as to where he can locate the lens. Since the lens can not be relocated to move the back focus, laser designers are constrained to position components to avoid locating them coincidence with the back focal point. This constraint can greatly restrict the design of the laser and result in a larger, less compact laser. What is needed therefore is a lens having an adjustable back focus such that the components of the laser can be placed at the most desirable location and the back focus of the lens can be adjusted to move the back focus location away from sensitive components while maintaining the location of the primary focal point of the lens.

SUMMARY OF THE INVENTION

The preceding and other shortcomings of the prior art are addressed and overcome by the present invention which provides a variable back focus controlled lens. The shape of the front and back surfaces of the lens are configured to adjust the back focus location while maintaining the primary focus location at a fixed preselected location.

DETAILED DESCRIPTION OF THE PREFERRED EMBODIMENTS

Figure 1:
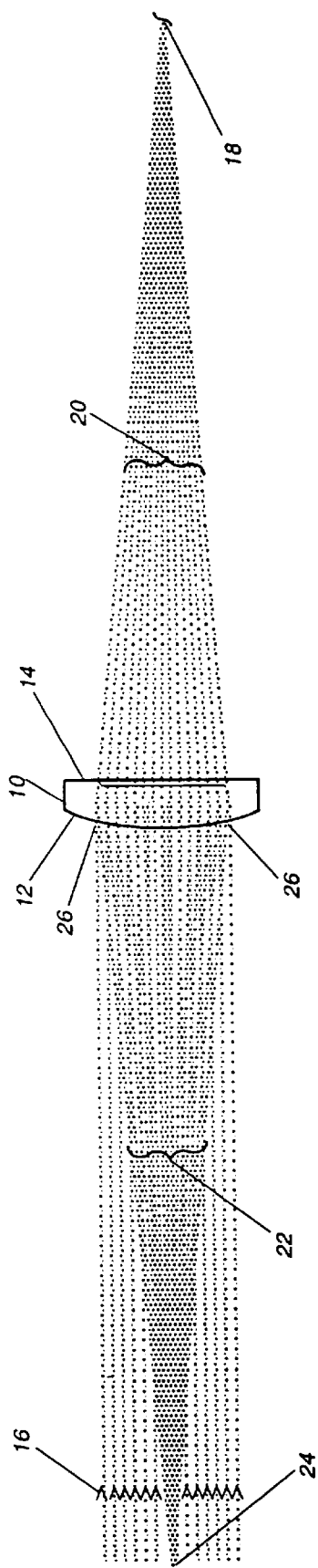
FIG. 1 is a diagram of a back focus controlled lens in accordance with a preferred embodiment of the present invention.

Referring to FIG. 1, a back focus controlled lens 10 for adjusting the back focus of a lens while maintaining the location of the primary focus is illustrated. The back focus controlled lens 10 of the present invention is preferably utilized in high energy applications, such as high power lasers, and provides a method for adjusting the back focus of a lens while maintaining the primary focus thus reducing the need for special positioning of components.

As illustrated in FIG. 1, the back focus controlled lens 10 includes a first surface 12 and a second surface 14. Light 16 is incident on the first surface 12 of the lens 10 where a portion of the light 16 passes through the first surface 12 of the lens 10 and propagates in the lens 10; and, another portion of the light 16 is reflected from the first surface 12. The impedance match between the lens 10 and the outside environment determines the amount of light 16 which passes through the first surface 12 of the lens 10 and the amount of light 16 which is reflected from the first surface 12.

The first reflected light 26 is the portion of the light 16 which reflects off the first surface 12. For an efficient lens 10, it is desirable to minimize the magnitude of the first reflected light 26 and maximize the magnitude of the light 16 which passes into the lens 10. To accomplish this, an anti-reflective coating is typically applied to the first 12 and second 14 surfaces of the lens 10 reducing the impedance mismatch between the lens 10 and the outside environment. This reduces the magnitude of the first reflected light 26 and increases the portion of the light 16 which passes through the first surface 12 of the lens.

The first surface 12 is typically convex in shape to the light 16 resulting in the first reflected light 26 being dispersed instead of focused. Since the magnitude of the first reflected light 26 is typically very small and the first reflected light 26 is dispersed instead of focused, the first reflected light 26 typically does not create a problem in the system and is ignored for most lens applications.

The portion of the light 16 which enters the lens 10 through the first surface 12 is incident on the second surface 14 of the lens 10 where a portion of the light 16 exits the lens 10 through the second surface 14 of the lens 10 and focuses at the primary focal point 18. The impedance match between the lens 10 and the outside environment determines the amount of the light 16 which exits the lens 10 through the second 14 surface and the amount of light 16 which is reflected back through the lens 10.

The second reflected light 22 is the portion of the light 16 which reflects off the second surface 14, propagates back through the lens 10 and exits the lens 10 through the first surface 12. For an efficient lens 10, it is desirable to minimize the magnitude of the second reflected light 22 and maximize the magnitude of the light 16 which passes through the lens 10 and focuses at the primary focal point 18. To accomplish this, an anti-reflective coating is typically applied to the first 12 and second 14 surfaces of the lens 10 reducing the impedance mismatch between the lens 10 and the outside environment. This reduces the magnitude of the second reflected light 22.

The second surface 14 is typically concave in shape to the light 16 resulting in the second reflected light 22 being focused instead of dispersed. The magnitude of the second reflected light 22 is typically very small, however even this small amount of light, when brought to a focus can damage and eventually destroy components located at the back focal point 24. By altering the shapes of the first 12 and second 14 surfaces, the present invention moves the location of the back focus 24 to a desired location while keeping the location of the primary focus 18 unchanged.

For the present invention, a Gauss-Newton optimization routine for automatic adjustment of curved surfaces is used to determine the proper shapes of the first 12 and second 14 surfaces. This routine is a ray tracing program available commercially by Stellar Software, P.O. Box 10183, Berkeley, Calif., under the trade name of BEAM4. To determine the proper shapes of the first 12 and second 14 surfaces necessary to place the back focus 24 at a desired location while maintaining the position of the primary focus 18, the desired position of the primary focus 18 is preselected and input into the ray tracing program. The desired location of the lens 10 and an initial shape of the first 12 and second 14 surfaces are also input into the ray tracing program. The ray tracing program calculates the location of the initial back focus 24. This back focus position 24 is examined to determined if it occurs at the desired location. If so, the shapes of the first 12 and second 14 surfaces are output from the ray tracing program and used in manufacturing the lens 10. If the back focus position 24 does not occur at the desired location, the first 12 and second 14 surfaces of the lens 10 require adjustment to move the back focus 24 to the desired location.

Typically, the second surface 14 is a near flat surface referred in the art as a plano convex surface which has a small affect on the position of the primary focus 18 but a more pronounced affect on the back focus 24 location. Conversely, the first surface 12 has a small affect on the back focus 24 but a more pronounced affect on the primary focus 18. To adjust the back focus 24 to a desired location, the shape of the second surface 14 is altered until the back focus 24 is in the proper location. This altering of the second surface 14 typically moves the location of the primary focus 18. To place the primary focus of the lens back at the proper location, the shape of the first surface 12 is altered until the primary focus 18 is located in the predetermined position. The new location of the back focus 24 is then calculated and compared to the desired location of the back focus 24. If the location of the back focus 24 is not in the desired location, the shape of the second surface 14 is again altered until the location of the back focus 24 is proper, the location of the primary focal point 18 is then calculated and compared to the predetermined location of the primary focal point 18. The process is continued until the primary focal point 18 and the back focal point 24 are in the desired locations.

Once the primary focal point 18 and the back focal point 24 are in the desired locations, the ray tracing program outputs the shape of the first 12 and second 14 surfaces which is used to manufacture a lens 10 having the desired primary 18 and back 24 focal points. In this way, the back focus controlled lens 10 provides an adjustable back focus location 24 while maintaining a primary focus location 18 providing a greater degree of freedom for the laser designer in locating components and designing the layout of the laser.

It will be appreciated by persons skilled in the art that the present invention is not limited to what has been shown and described hereinabove. The scope of invention is limited solely by the claims which follow.

What is claimed is:

1. A method for adjusting the back focus location of an apparatus to a preselected back focus location comprising the steps of:

providing a lens having a first and a second surface;
   configuring the lens to focus light at a fixed preselected primary focal point location;
   determining the location of an initial back focal point defined by the lens configuration;
   determining if the initial back focal point is located at the preselected back focus location; and,
   selectively altering the shape of the first and second surfaces to move the back focal point to the preselected back focus location while maintaining substantially fixed the location of the fixed preselected primary focal point if the location of the initial back focal point is different than the preselected back focus location.

2. The method of claim 1, further comprising selecting an initial location of the lens;

wherein configuring the lens comprises shaping the first and second surfaces of the lens such that the lens focuses light at the fixed preselected primary focal point location; and,
   wherein determining the location comprises calculating the location of the initial back focal point of the lens using a ray tracing computer program.

3. The method of claim 2, wherein selectively altering comprises shaping the first surface until the back focal point is located at the preselected back focus location, whereby shaping of the first surface can move the location of the primary focus; determining if the location of the primary focus still occurs at the fixed preselected primary focus location; shaping the second surface until the primary focus is placed back at the preselected fixed primary focus location if the primary focus occurs in a location other than the fixed preselected primary focus location; determining if the location of the back focal point of the lens occurs at the preselected back focus location; and, repeating the steps of shaping the first surface, determining if the location of the primary focus still occurs at the fixed preselected back focus location, shaping the second surface, and determining if the location of the back focal point occurs at the preselected back focus location until the primary focus is located at the primary focal point location and the back focal point is located at the preselected back focus location.

4. The method of claim 3, further comprising manufacturing a lens having said first and second surface shapes.

5. The method of claim 2, wherein calculating the location of the initial back focal point comprises calculating the location of the initial back focal point of the lens using a Gauss-Newton optimization routing for automatic adjustment of curved surfaces.

6. A method for designing a lens having a first and a second surface for a system having a preselected fixed primary focus location and an electrical component which is positioned in a component location, the lens being designed such that a back focus location of the lens occurs in a position different than the preselected component location, the method comprising the steps of:

configuring the shape of the lens to focus light at the preselected primary focal point location;
   determining the location of an initial back focal point defined by the lens shape;
   determining if the initial back focal point is located at the component location; and,
   selectively shaping the lens to move the back focal point to a back focus location which is different than the component location while maintaining substantially fixed the location of the fixed preselected primary focal point if the initial back focal point location is located at the component location.

7. The method of claim 6, further comprising selecting a preselected back focus location different than said component location; and, wherein selectively shaping comprises selectively shaping the lens to move the back focal point to the preselected back focus location while maintaining substantially fixed the location of the fixed preselected primary focal point if the initial back focal point location is located at the component location.

8. The method of claim 7, further comprising selecting an initial location of the lens;

wherein configuring the shape of the lens comprises selecting an initial shape of the first and second surfaces of the lens such that the lens focuses light at the fixed preselected primary focal point location; and, wherein determining the location comprises calculating the location of the initial back focal point of the lens from the initial location of the lens and the first and second surface shapes using a ray tracing computer program.

9. The method of claim 8, wherein selectively shaping comprises shaping of the first surface until the back focal point is located at the preselected back focus location, whereby shaping the first surface can move the location of the primary focus; determining if the location of the primary focus still occurs at the fixed preselected primary focus location; shaping the second surface until the primary focus is placed back at the preselected fixed primary focus location if the primary focus occurs in a location other than the fixed preselected primary focus location; determining if the location of the back focal point of the lens occurs at the preselected back focus location; and, repeating the steps of shaping the first surface, determining if the location of the primary focus still occurs at the fixed preselected back focus location, shaping the second surface, and determining if the location of the back focal point occurs at the preselected back focus location until the primary focus is located at the primary focal point location and the back focal point is located at the preselected back focus location.

10. The method of claim 9, further comprising manufacturing a lens having the first and second surface shapes.

11. The method of claim 9, wherein calculating the location of the initial back focal point comprises calculating the location of the initial back focal point of the lens using a Gauss-Newton optimization routing for automatic adjustment of curved surfaces.

12. A method for designing the shape of a lens having a first and a second surface for a laser to focus laser light at a fixed preselected primary focus location, the laser having an electrical component which would be adversely affected if contacted by focused laser light and is positioned in a component location, the lens being designed such that a back focus location of the lens occurs in a location different than the location of the electrical component, the method comprising the steps of:

configuring the shape of the lens to focus the laser light at the preselected primary focal point location;

determining the location of an initial back focal point defined by the lens shape;

determining if the initial back focal point is located at the component location; and, selectively shaping the lens to move the back focal point to a back focus location which is different than the location of the electrical component while maintaining substantially fixed the location of the fixed preselected primary focal point if the initial back focal point location is located at the component location.

13. The method of claim 12, further comprising:

selecting a preselected back focus location different than said component location; and, wherein selectively shaping comprises selectively shaping the lens to move the back focal point to the preselected back focus location while maintaining substantially fixed the location of the fixed preselected primary focal point if the initial back focal point location is located at the component location.

14. The method of claim 12, further comprising:

selecting an initial location of the lens;

wherein configuring the shape of the lens comprises selecting an initial shape of the first and second surfaces of the lens such that the lens focuses light at the fixed preselected primary focal point location; and, wherein determining the location comprises calculating the location of the initial back focal point of the lens from the initial location of the lens and the shape of the first and second surfaces using a ray tracing computer program.

15. The method of claim 14, wherein selectively shaping comprises shaping the first surface until the back focal point is located at the preselected back focus location, whereby shaping the first surface can move the location of the primary focus; determining if the location of the primary focus still occurs at the fixed preselected primary focus location; shaping the second surface until the primary focus is placed back at the preselected fixed primary focus location if the primary focus occurs in a location other than the fixed preselected primary focus location; determining if the location of the back focal point of the lens occurs at the preselected back focus location; and, repeating the steps of shaping the first surface, determining if the location of the primary focus still occurs at the fixed preselected back focus location, shaping the second surface, and determining if the location of the back focal point occurs at the preselected back focus location until the primary focus is located at the primary focal point location and the back focal point is located at the preselected back focus location.

16. The method of claim 15, further comprising manufacturing a lens having the first and second shapes.

17. The method of claim 15, wherein calculating the location of the initial back focus comprises calculating the location of the initial back focal point of the lens using a Gauss-Newton optimization routing for automatic adjustment of curved surfaces.

\* \* \* \* \*